United States Patent
Bakker et al.

(10) Patent No.: US 9,996,700 B2
(45) Date of Patent: Jun. 12, 2018

(54) METHOD AND SYSTEM FOR CORRUPTING UNWANTED DATA IN A COMMUNICATIONS STREAM

(71) Applicant: Outsite Networks, Inc., Norfolk, VA (US)

(72) Inventors: Anton Bakker, Norfolk, VA (US); Marc L. Allen, Virginia Beach, VA (US)

(73) Assignee: OUTSITE NETWORKS, INC., Norfolk, VA (US)

(*) Notice: Subject to any disclaimer, the term of this patent is extended or adjusted under 35 U.S.C. 154(b) by 0 days. days.

(21) Appl. No.: 15/429,949

(22) Filed: Feb. 10, 2017

(65) Prior Publication Data

US 2017/0249470 A1    Aug. 31, 2017

Related U.S. Application Data

(60) Provisional application No. 62/300,267, filed on Feb. 26, 2016.

(51) Int. Cl.
| G06F 21/60 | (2013.01) |
| G06K 19/06 | (2006.01) |
| G06K 7/14 | (2006.01) |
| G06F 17/30 | (2006.01) |
| H04L 29/06 | (2006.01) |

(52) U.S. Cl.
CPC ...... *G06F 21/606* (2013.01); *G06F 17/30879* (2013.01); *G06K 7/1413* (2013.01); *G06K 7/1417* (2013.01); *G06K 19/06028* (2013.01); *G06K 19/06037* (2013.01); *H04L 65/4069* (2013.01)

(58) Field of Classification Search
None
See application file for complete search history.

(56) References Cited

U.S. PATENT DOCUMENTS 8,556,164 B1 * 10/2013 Freedman .......... G06Q 30/0207
235/375

* cited by examiner

*Primary Examiner* — Kristy A Haupt
(74) *Attorney, Agent, or Firm* — Carlos R. Villamar; The Villamar Firm PLLC

(57) ABSTRACT

A system, method, and computer program for monitoring and corrupting a data stream, includes a data stream transmitting device having a barcode scanner that transmits a stream of data corresponding to a scanned barcode; a data stream receiver device having a barcode processing system that receives the stream; and a monitoring and corrupting device coupled therebetween having a database storing rules for detecting and corrupting patterns of data in the stream, and which monitors the stream, and based on the rules determines if the stream is unwanted, and if so corrupts the stream and transmits the corrupted stream to the barcode processing system so that the barcode data stream cannot be correctly received by the data stream receiver device. Otherwise, if the stream of data is wanted, the stream of data is allowed to be correctly received by the data stream receiver device.

6 Claims, 2 Drawing Sheets

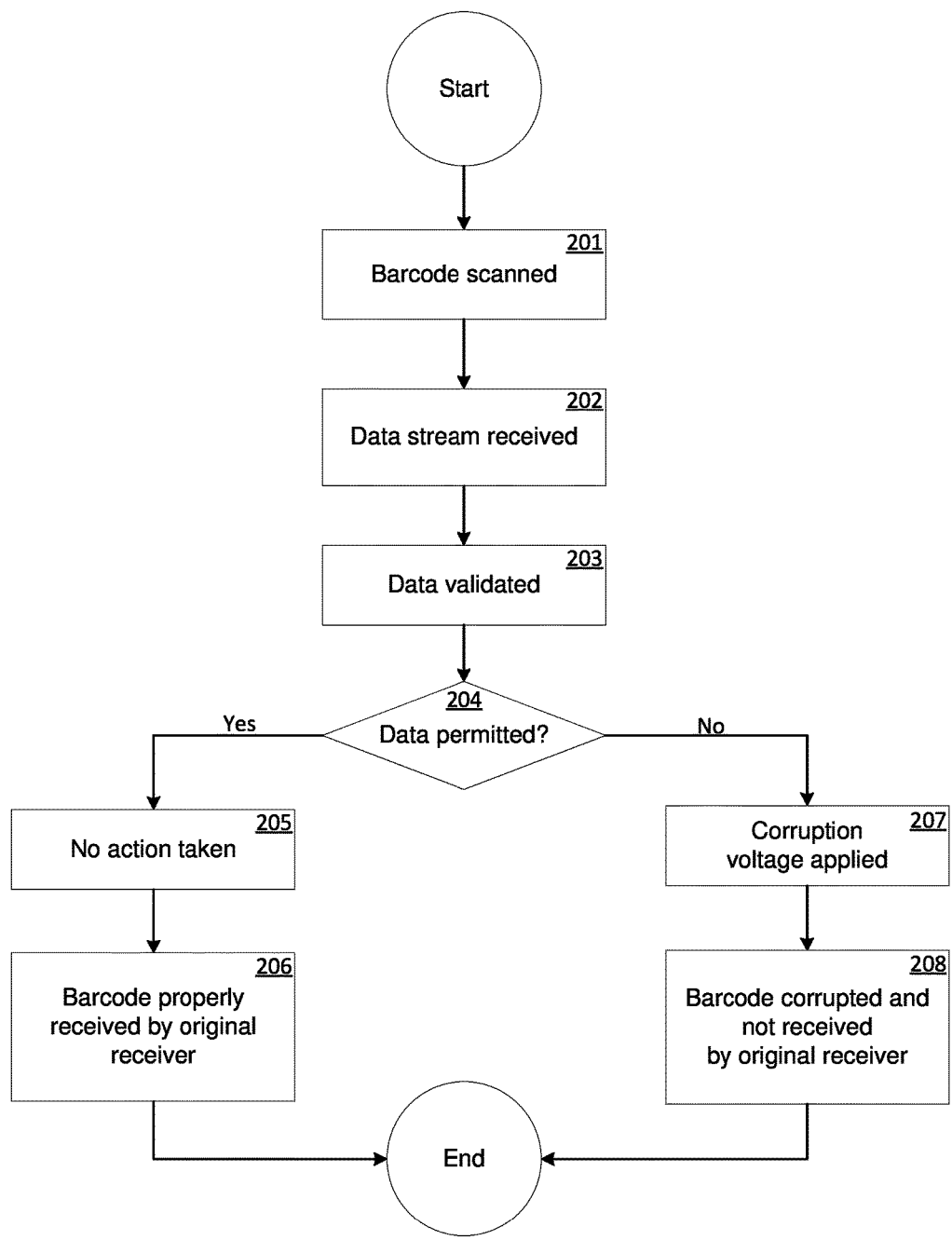
FIG. 2    200

METHOD AND SYSTEM FOR CORRUPTING UNWANTED DATA IN A COMMUNICATIONS STREAM

CROSS REFERENCE TO RELATED DOCUMENTS

The present invention claim priority to U.S. Provisional Patent Application Ser. No. 62/300,267 of Anton BAKKER et al., entitled "METHOD AND SYSTEM FOR CORRUPTING UNWANTED DATA IN A COMMUNICATIONS STREAM," filed on Feb. 26, 2016, the entire disclosure of which is hereby incorporated by reference herein.

BACKGROUND OF THE INVENTION

Field of the Invention

The present invention generally relates to device communications systems and methods, and more particularly to systems and methods for monitoring, blocking, and/or corrupting unwanted data in communication streams, should such data be disallowed, and the like.

Discussion of the Background

Digital codes, such as barcodes, universal product identifier (UPC) codes, quick response (QR) codes, GS1 standardized (GS1) codes, including scanning words or numbers, and the like, are widely distributed and used for unique identification of events, commercial offers, personal identity, products, and the like. However, misuse of such codes can cause loss of revenue and confusion. For example, a discount barcode intended for a single use by a specific user can sometimes be improperly used multiple times.

SUMMARY OF THE INVENTION

Therefore, there is a need to provide a system and method that addresses the above and other problems, for example, including detecting, preventing, and the like, misuse of digital codes, such as barcodes, universal product identifier (UPC) codes, quick response (QR) codes, GS1 standardized (GS1) codes, including scanning words or numbers, and the like, and to do preferably on existing equipment, and the like, capable of receiving such codes, but unable to properly validate, confirm, authenticate, and the like, such codes. In illustrative embodiments, the system and method can include a monitoring, corrupting, and the like, device configured to prevent such unwanted codes from being used when they are not valid to do so. For example, electronic coupons are often offered to users as an image of a barcode. The coupon may only intend the barcode to be used a limited number of times, but the Point of Sale (POS) register may not have the ability to enforce such a limitation. The barcode may be provided in either printed or electronic form (e.g., as an image displayed on a person's smart phone) and entered into the sales system via a barcode scanner. Preventing the POS register from receiving the barcode can include inserting the above-noted monitoring, corrupting, and the like, device between the barcode scanner and the POS register, wherein the device is configured to identify an incoming barcode as potentially unwanted, and prevent the POS register from receiving such unwanted barcode. In order to prevent the barcode information from reaching the POS intact, the device can be configured to interrupt a communications line by various methods (e.g., interrupting a critical connection via a wired relay or optoisolator, or superimposing a voltage across a voltage sensitive communications line, etc.).

Accordingly, in illustrative aspects of the present invention there is provided a system, method, and computer program for monitoring and corrupting a data stream, including a data stream transmitting device, including a data stream transmitting device having a barcode scanner that transmits a stream of data corresponding to a scanned barcode; a data stream receiver device having a barcode processing system that receives the stream; and a monitoring and corrupting device coupled therebetween having a database storing rules for detecting and corrupting patterns of data in the stream, and which monitors the stream, and based on the rules determines if the stream is unwanted, and if so corrupts the stream and transmits the corrupted stream to the barcode processing system so that the barcode data stream cannot be correctly received by the data stream receiver device. Otherwise, if the stream of data is wanted, the stream of data is allowed to be correctly received by the data stream receiver device.

The monitoring and corrupting device is configured to corrupt the stream of data corresponding to the scanned barcode by generating and imposing a voltage on the stream of data corresponding to the scanned barcode so that the barcode data stream cannot be correctly received by the data stream receiver device.

The monitoring and corrupting device is configured to corrupt the stream of data corresponding to the scanned barcode by interrupting the data stream through use of an electrically controlled mechanical relay so that the barcode data stream cannot be correctly received by the data stream receiver device.

The monitoring and corrupting device is configured to corrupt the stream of data corresponding to the scanned barcode by interrupting the data stream through use of an electrically controlled optoisolator so that the barcode data stream cannot be correctly received by the data stream receiver device.

The monitoring and corrupting device is configured to corrupt the stream of data corresponding to the scanned barcode by interrupting the data stream through use of an electronic or electronically controlled switching device so that the barcode data stream cannot be correctly received by the data stream receiver device.

Still other aspects, features, and advantages of the present invention are readily apparent from the following detailed description, by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIG. 2 is an illustrative flowchart wherein a data stream is processed from a digital code scanner, such as a barcode, universal product identifier (UPC) code, quick response (QR) code, GS1 standardized (GS1) code, including scanned words or numbers, and the like, validated, and then, if the data stream is deemed unpermitted, a corruption voltage is applied and the original data stream is not received by the digital code processing unit, such as a POS register, consumer payment point, and the like, wherein if the data stream is deemed permitted, it is passed, unmodified, to the digital code processing unit.

DETAILED DESCRIPTION OF THE PREFERRED EMBODIMENTS

Figure 1:
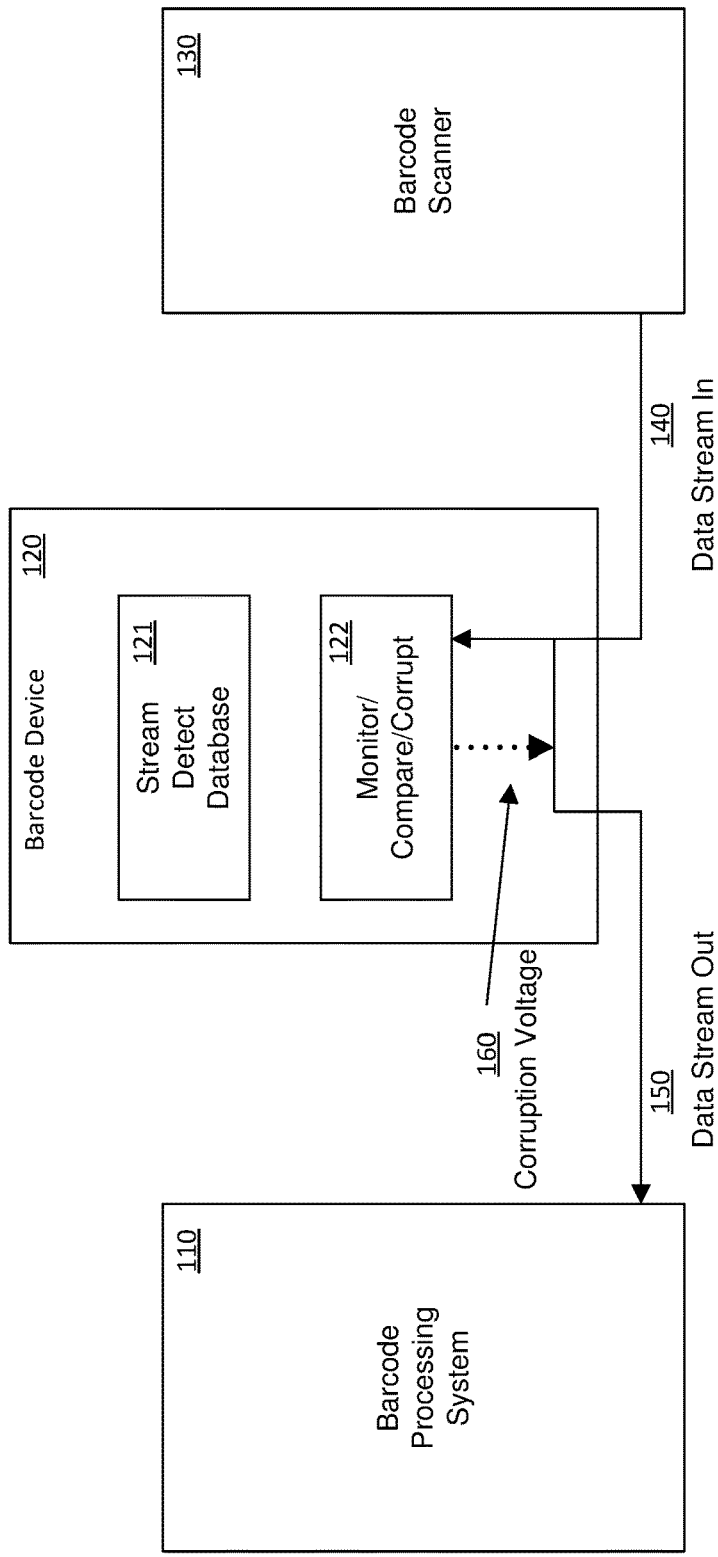
FIG. 1 is an illustrative system wherein a data stream from a digital code scanner, such as a barcode, universal product identifier (UPC) code, quick response (QR) code, GS1 standardized (GS1) code, including scanned words or numbers, and the like, scanner can be monitored and optionally corrupted, and the like, to prevent a digital code processing unit, such as a POS register, consumer payment point, and the like from properly receiving such unwanted codes.

Referring now to the drawings and more particular to FIG. 1 thereof, there is shown illustrative system 100, wherein a data stream from a digital code scanner, such as a barcode, universal product identifier (UPC) code, quick response (QR) code, GS1 standardized (GS1) code, including scanned words or numbers, and the like, scanner can be monitored and optionally corrupted, and the like, to prevent a digital code processing unit from properly receiving such unwanted codes. In FIG. 1, the barcode scanning system 100 can include a Barcode Scanner 130, for example, including any suitable device that transmits a stream of data corresponding to a scanned barcode, and the like. For example, the Barcode Scanner 130 generates a data stream, shown as Data Stream In 140, corresponding to a scanned barcode, and the like. A Barcode Processing System 110 is provided and can include any suitable device that accepts a stream of barcode data, and the like, shown as Data Stream Out 150.

The system 100 also includes a Barcode Device 120, for example, provided between the Barcode Scanner 130 and the Barcode Processing System 110. The device 120 includes a Stream Detect Database 121 that stores information regarding which barcodes to detect and how much of the barcode needs to be seen before detection is verified, and the like. The Barcode Detect Database 121 also includes information that allows the device 120 to determine if a barcode should be allowed to pass uncorrupted at any time.

The Barcode Device 120 also includes a Monitor/Compare/Corrupt device 122 that is responsible for using the information in the Barcode Detect Database 121, comparing such information to the Stream Data In 140 coming from the Barcode Scanner 130, and determining if the barcode should be corrupted or not. If the device 122 determines that a barcode needs to be corrupted, the device 122 superimposes, and the like, a Corruption Voltage 160 onto the line, for example, such that barcode data on line 140 is improperly transmitted to the line 150. Additionally, while Corruption Voltage 160 is described as an employed method of corrupting the barcode data on line 140, such corruption can be achieved by any suitable form of electronic interruption, corruption, and the like, such as based on a relay or current source device, and the like, and as will be appreciated by those of ordinary skill in the relevant art(s).

According, the Corruption Voltage 160 can represents forcing a line break, and the like, on the communications line between the Barcode Scanner 130 and the Barcode Processing System 110. If, however, the devices 122 determines that a barcode should be allowed to pass uncorrupted, the device takes no action to corrupt the data, and passes the data on the line 140 directly to the line 150 for processing by the Barcode Processing System 110, as if the Barcode Device 120 were never there. In FIG. 1, lines 140 and 150 are each shown as a single line, for the sake of simplicity in explanation. However, such lines can actually represent one of any suitable number of serial and/or parallel communications lines, and the like, based on various digital technologies, and the like. Furthermore, In FIG. 1, lines 140 and 150 may also include a series of in-line devices forwarding the stream data. For instance, the Barcode Scanner 130 may incorporate a wireless scanning device that transmits the scanned data to a wireless receiver that then forwards the stream data to the Barcode Processing System 110.

Accordingly, the device 122 and the Corruption Voltage 160 can be configured to disrupt and/or corrupt the communications data, as needed, and as described above. In the case of higher-level communication systems (e.g., USB), the device 122 can be configured to corrupt several communications attempts by the Barcode Scanner 130 to completely corrupt the data stream on the line 140 and prevent such unwanted data stream from being received by the Barcode Processing System 110.

FIG. 2 is an illustrative flowchart wherein a data stream is processed from a digital code scanner, such as a barcode, universal product identifier (UPC) code, quick response (QR) code, GS1 standardized (GS1) code, including scanned words or numbers, and the like, validated, and then, if the data stream is deemed unpermitted, a corruption voltage is applied and the original data stream is not received by the digital code processing unit, such as a POS register, consumer payment point, and the like, wherein if the data stream is deemed permitted, it is passed, unmodified, to the digital code processing unit. In FIG. 2, a barcode is scanned in step 201 by a Barcode Scanner 130, and the Data Stream In 140 is received by the Monitor/Compare/Corrupt 122 in step 202. In step 203, the Stream Detect Database 121 is used to determine if the Data Stream In 140 is permitted to be passed to the Barcode Processing System 110 via the Data Stream Out 150 without corruption.

If the Data Stream In 140 is determined to be permitted, step 205 takes no action and, in step 206, the original Data Stream In 140 is passed to the Barcode Processing System 110. However, should the Data Stream In 140 be determined to be unpermitted, step 207 applies a Corruption Voltage 160 to the data stream, generated a corrupted Data Stream Out 150 that is then passed to the Barcode Processing System 110.

The above-described devices and subsystems of the illustrative embodiments of FIG. 1 can include, for example, any suitable servers, workstations, PCs, laptop computers, PDAs, Internet appliances, handheld devices, cellular telephones, wireless devices, other devices, and the like, capable of performing the processes of the illustrative embodiments of FIG. 1. The devices and subsystems of the illustrative embodiments of FIG. 1 can communicate with each other using any suitable protocol and can be implemented using one or more programmed computer systems or devices.

One or more interface mechanisms can be used with the illustrative embodiments of FIG. 1, including, for example, Internet access, telecommunications in any suitable form (e.g., voice, modem, and the like), wireless communications media, and the like. For example, the employed communications networks can include one or more wireless communications networks, cellular communications networks, 3G communications networks, Public Switched Telephone Network (PSTNs), Packet Data Networks (PDNs), the Internet, intranets, a combination thereof, and the like. Accordingly, the devices and subsystems of the illustrative embodiments can be implemented on the World Wide Web.

It is to be understood that the devices and subsystems of the illustrative embodiments of FIG. 1 are for illustrative purposes, as many variations of the specific hardware and/or software used to implement the illustrative embodiments are possible, as will be appreciated by those skilled in the relevant art(s). For example, the functionality of one or more of the devices and subsystems of the illustrative embodiments of FIG. 1 can be implemented via one or more programmed computer systems or devices.

To implement such variations as well as other variations, a single computer system can be programmed to perform the special purpose functions of one or more of the devices and subsystems of the illustrative embodiments of FIG. 1. On the other hand, two or more programmed computer systems or devices can be substituted for any one of the devices and subsystems of the illustrative embodiments of FIG. 1. Accordingly, principles and advantages of distributed processing, such as redundancy, replication, and the like, also can be implemented, as desired, to increase the robustness and performance the devices and subsystems of the illustrative embodiments of FIG. 1.

The devices and subsystems of the illustrative embodiments of FIG. 1 can store information relating to various processes described herein. This information can be stored in one or more memories, such as a hard disk, optical disk, magneto-optical disk, RAM, and the like, of the devices and subsystems of the illustrative embodiments of FIG. 1. One or more databases of the devices and subsystems of the illustrative embodiments of FIG. 1 can store the information used to implement the illustrative embodiments of the present invention. The databases can be organized using data structures (e.g., records, tables, arrays, fields, graphs, trees, lists, and the like) included in one or more memories or storage devices listed herein. The processes described with respect to the illustrative embodiments of FIG. 1 can include appropriate data structures for storing data collected and/or generated by the processes of the devices and subsystems of the illustrative embodiments of FIG. 1 in one or more databases thereof.

All or a portion of the devices and subsystems of the illustrative embodiments of FIG. 1 can be conveniently implemented using one or more general purpose computer systems, microprocessors, digital signal processors, microcontrollers, and the like, programmed according to the teachings of the illustrative embodiments of the present invention, as will be appreciated by those skilled in the computer and software arts. Appropriate software can be readily prepared by programmers of ordinary skill based on the teachings of the illustrative embodiments, as will be appreciated by those skilled in the software art. In addition, the devices and subsystems of the illustrative embodiments of FIG. 1 can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present invention can include software for controlling the devices and subsystems of the illustrative embodiments of FIG. 1, for driving the devices and subsystems of the illustrative embodiments of FIG. 1, for enabling the devices and subsystems of the illustrative embodiments of FIG. 1 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the illustrative embodiments of FIG. 1. Computer code devices of the illustrative embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present invention can be distributed for better performance, reliability, cost, and the like.

As stated above, the devices and subsystems of the illustrative embodiments of FIG. 1 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention have been described in connection with a number of illustrative embodiments and implementations, the present invention is not so limited, but rather covers various modifications and equivalent arrangements, which fall within the purview of the appended claims.

What is claimed is:

1. An electronic system configured to monitor and corrupt a data stream, the system comprising:
    a data stream transmitting device, including a barcode scanner configured to transmit a stream of data corresponding to a scanned barcode;
    a data stream receiver device, including a barcode processing system configured to receive the stream of data corresponding to the scanned barcode; and
    a monitoring and corrupting device coupled between the data stream transmitting device and the data stream receiver device, and including a database storing rules for detecting patterns of data in the stream of data corresponding to the scanned barcode, and rules for corrupting the detected patterns of data;

wherein the monitoring and corrupting device is further configured to monitor the stream of data corresponding to the scanned barcode, and based on the detecting and corrupting rules determine if the stream of data corresponding to the scanned barcode is unwanted, and if so configured to corrupt the stream of data corresponding to the scanned barcode and transmit the corrupted data stream to the data stream receiver device so that the barcode data stream cannot be correctly received by the data stream receiver device;

the monitoring and corrupting device is further configured to monitor the stream of data corresponding to the scanned barcode, and based on the detecting and corrupting rules determine if the stream of data corresponding to the scanned barcode is wanted, and if so configured to allow the stream of data corresponding to the scanned barcode to be correctly received by the data stream receiver device; and the monitoring and corrupting device is configured to corrupt the stream of data corresponding to the scanned barcode so that the barcode data stream cannot be correctly received by the data stream receiver device, by at least one of:

generating and imposing a voltage on the stream of data corresponding to the scanned barcode, interrupting the data stream through use of an electrically controlled mechanical relay, and interrupting the data stream through use of an electrically controlled optoisolator.

2. The electronic system of claim 1, wherein the monitoring and corrupting device is configured to corrupt the stream of data corresponding to the scanned barcode by interrupting the data stream through use of an electronic or electronically controlled switching device so that the barcode data stream cannot be correctly received by the data stream receiver device.

3. An electronic method for monitoring and corrupting a data stream, the method comprising:

transmitting with a data stream transmitting device, including a barcode scanner a stream of data corresponding to a scanned barcode;

receiving with a data stream receiver device, including a barcode processing system the stream of data corresponding to the scanned barcode;

coupling a monitoring and corrupting device between the data stream transmitting device and the data stream receiver device, and including in the monitoring and corrupting device a database, and storing with the database rules for detecting patterns of data in the stream of data corresponding to the scanned barcode, and rules for corrupting the detected patterns of data;

monitoring with the monitoring and corrupting device the stream of data corresponding to the scanned barcode, and based on the detecting and corrupting rules determining if the stream of data corresponds to the scanned barcode is unwanted, and if so corrupting the stream of data corresponding to the scanned barcode and transmitting the corrupted data stream to the data stream receiver device so that the barcode data stream cannot be correctly received by the data stream receiver device;

monitoring with the monitoring and corrupting device the stream of data corresponding to the scanned barcode, and based on the detecting and corrupting rules determining if the stream of data corresponds to the scanned barcode is wanted, and if so allowing the stream of data corresponding to the scanned barcode to be correctly received by the data stream receiver device; and corrupting with the monitoring and corrupting device the stream of data corresponding to the scanned barcode so that the barcode data stream cannot be correctly received by the data stream receiver device, by at least one of:

generating and imposing a voltage on the stream of data corresponding to the scanned barcode, interrupting the data stream through use of an electrically controlled mechanical relay, and interrupting the data stream through use of an electrically controlled optoisolator.

4. The electronic method of claim 3, further comprising:

corrupting with the monitoring and corrupting device the stream of data corresponding to the scanned barcode by interrupting the data stream through use of an electronic or electronically controlled switching device so that the barcode data stream cannot be correctly received by the data stream receiver device.

5. A computer program product for an electronic method for monitoring and corrupting a data stream including one or more computer readable instructions embedded on tangible, non-transitory computer readable medium and configured to cause one or more computer processors to perform the steps of:

transmitting with a data stream transmitting device, including a barcode scanner a stream of data corresponding to a scanned barcode;

receiving with a data stream receiver device, including a barcode processing system the stream of data corresponding to the scanned barcode;

coupling a monitoring and corrupting device between the data stream transmitting device and the data stream receiver device, and including in the monitoring and corrupting device a database, and storing with the database rules for detecting patterns of data in the stream of data corresponding to the scanned barcode, and rules for corrupting the detected patterns of data;

monitoring with the monitoring and corrupting device the stream of data corresponding to the scanned barcode, and based on the detecting and corrupting rules determining if the stream of data corresponds to the scanned barcode is unwanted, and if so corrupting the stream of data corresponding to the scanned barcode and transmitting the corrupted data stream to the data stream receiver device so that the barcode data stream cannot be correctly received by the data stream receiver device;

monitoring with the monitoring and corrupting device the stream of data corresponding to the scanned barcode, and based on the detecting and corrupting rules determining if the stream of data corresponds to the scanned barcode is wanted, and if so allowing the stream of data corresponding to the scanned barcode to be correctly received by the data stream receiver device; and corrupting with the monitoring and corrupting device the stream of data corresponding to the scanned barcode so that the barcode data stream cannot be correctly received by the data stream receiver device, by at least one of:

generating and imposing a voltage on the stream of data corresponding to the scanned barcode, interrupting the data stream through use of an electrically controlled mechanical relay, and interrupting the data stream through use of an electrically controlled optoisolator.

6. The computer program product of claim 5, further comprising:
  corrupting with the monitoring and corrupting device the stream of data corresponding to the scanned barcode by interrupting the data stream through use of an electronic or electronically controlled switching device so that the barcode data stream cannot be correctly received by the data stream receiver device.

* * * * *